(No Model.)
N. NILSON.
PIPE COUPLING.
No. 420,281. Patented Jan. 28, 1890.
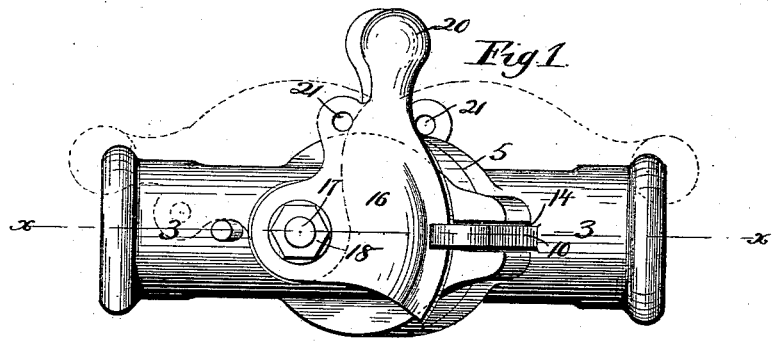
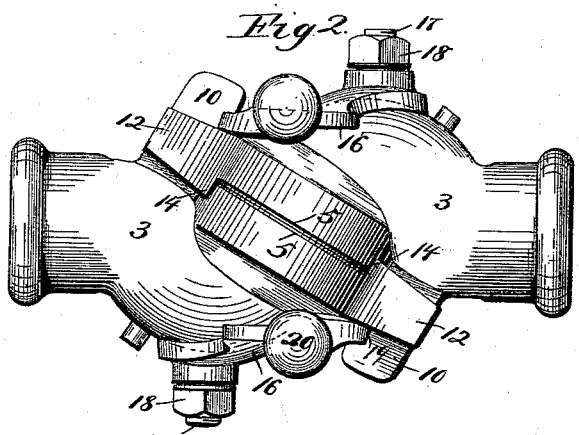
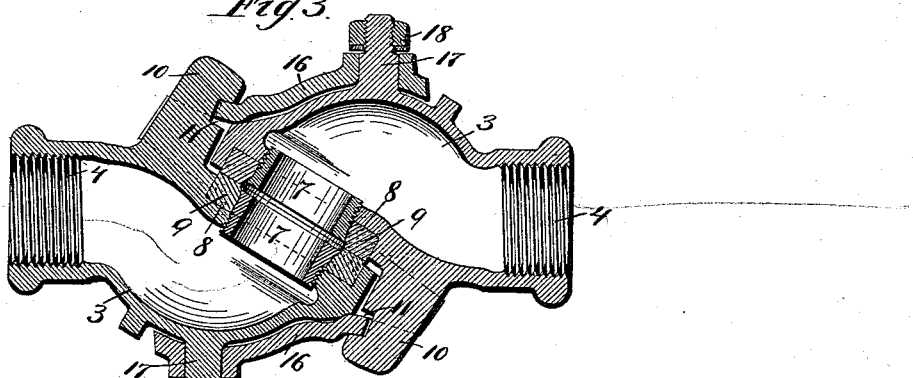
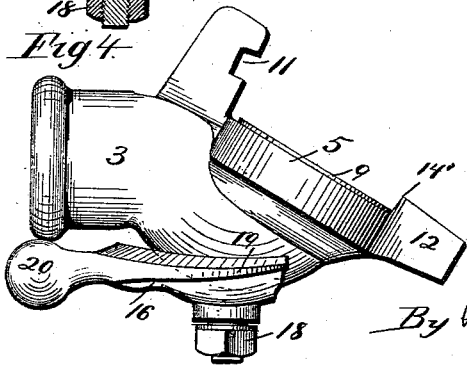
Witnesses
J. Jessen
Ray S. Gaskill
Inventor
Nils Nilson.
By Paul T. Merwin attys

UNITED STATES PATENT OFFICE.

NILS NILSON, OF MINNEAPOLIS, MINNESOTA.

PIPE-COUPLING.

SPECIFICATION forming part of Letters Patent No. 420,281, dated January 28, 1890.

Application filed August 6, 1889. Serial No. 319,900. (No model.)

*To all whom it may concern:*

Be it known that I, NILS NILSON, of Minneapolis, in the county of Hennepin and State of Minnesota, have invented certain new Improvements in Pipe-Couplings, of which the following is a specification.

The object of this invention is to provide an improved coupling for use especially for coupling the steam-pipes of railway-cars; and I aim to provide a coupling that may be used generally with any system of steam-heating, that will be simple and durable, readily coupled or uncoupled, and will automatically uncouple in case the cars are separted before the parts of the coupling are separated.

The invention consists in the construction and combination hereinafter described, and particularly pointed out in the claims.

In the accompanying drawings, forming a part of this specification, Figure 1 is a side elevation of my improved coupling. Fig. 2 is a plan of the same. Fig. 3 is a horizontal section on line $xx$ of Fig. 1. Fig. 4 is a plan of one member of the coupling.

The coupling consists, essentially, of the members 3 3, which are alike, and are each provided with an inclined face 5, that is at an angle of about forty-five degrees to the main axis of the coupling. Each member is provided also with a threaded end 4, by which it may be secured to the end of the steam-pipe of the car. There is an opening through the inclined face of each member of the coupling, which is preferably screw-threaded, and a screw-threaded sleeve or ring 7 is fitted into this opening in the face of the member. A groove 8 is formed in the inclined face of each member, one wall thereof being made by the outer surface of the sleeve 7. A packing or gasket ring 9 is placed in the groove 8, and is expanded therein and held in place by the ring 7. Each member of the coupling is also provided at the rear side of its inclined face with a projection or lug 10, extending in a direction at right angles to the plane of the inclined face and provided with a slot 11. Each member is also provided at its forward end with a projection 12, having an open slot 14, that is adapted to receive the projection or lug 10 on the other member of the coupling. The projection 12 is provided with a shoulder 14', extending at right angles to the inclined face of the member and adapted to rest against the outer wall of the opposite member of the coupling. The shoulders 14' serve the important function of holding the two faces of the coupling together, serving as hooks to receive the entire pull or strain that comes on the coupling, and they also cause the two faces to be moved together or separated by being moved in a line perpendicular to said faces, thereby preventing the sliding of one face over the other and the consequent injury and wear of the gaskets and faces.

The wall of each member of the coupling in the rear of and opposite to its inclined face is preferably of an outwardly-curved form, and is made in this shape for the purpose of preventing contraction of the passage through the coupling. A latch 16 is pivotally supported on the outer curved surface of each member of the coupling, being preferably arranged upon a stud 17 and held in place by a nut 18. This latch has a wedge-shaped edge 19, that engages the notch 11 in the projection 10 on the other member of the coupling, and thereby preventing the projection 12 from slipping off the projection 10. When both latches are in engagement with their respective projections, the two members of the coupling are firmly locked together, the strain or pull coming on the shoulders 14', and they cannot be pulled apart until the latches are released. The latches 16 are preferably provided with suitable handles 20, by which they may be operated, and with openings 21, to which chains or wires may be attached. These chains may be connected to the bodies of the cars, and be arranged so that the latches will be released should an undue strain be brought on the coupling, thus permitting the coupling to be automatically uncoupled. The coupling thus constructed is compact, tight, durable, and easily separated, and may be applied to any of the ordinary systems of steam-heating for railway-cars.

While I have described the coupling as designed especially for steam-pipes of railway-cars, I do not confine myself to such use, as it may be applied to any other uses, such as coupling hose, water-pipes, &c.

I claim as my invention—

1. The herein-described coupling, consisting of two members each having an inclined face and provided with a lug or projection that engages the outer surface of the wall of the other member and receives the strain or pull on the coupling, and a movable latch upon each member adapted to engage a notch in the projection on the other member, substantially as described.

2. The pipe-coupling comprising the members 3 3, each having an inclined face, a gasket or packing on said face, and a notched projection at one side of said face and a slotted projection at the other side of said face, the slotted projection on each member being adapted to engage the notched projection on the other member, and a pivoted latch on each member adapted to engage the notch in the projection on the other member, substantially as described.

3. The pipe-coupling comprising the two members, each having an inclined face and each provided with a shoulder projecting beyond said face and perpendicular thereto, in combination with a latch on each member adapted to hold the two members together, with the shoulder on each member in engagement with the wall of the other member, whereby said shoulders receive the main portion of the strain, and whereby when the latches are released, said members automatically separate and said shoulders cause the faces to move away from each other in a line perpendicular to said faces.

In testimony whereof I have hereunto set my hand this 23d day of July, 1889.

NILS NILSON.

In presence of—
A. C. PAUL,
A. M. GASKILL.